(12) United States Patent
Huang

(10) Patent No.: US 6,744,464 B2
(45) Date of Patent: Jun. 1, 2004

(54) APPARATUS AND METHOD FOR REAL-TIME TESTING/ADJUSTING OF TELEVISION PICTURE COLORS

(75) Inventor: Kaihua Huang, Shenzhen (CN)

(73) Assignee: TCL King Electronics (Shenzen) Co., Ltd. (CN)

( * ) Notice: Subject to any disclaimer, the term of this patent is extended or adjusted under 35 U.S.C. 154(b) by 369 days.

(21) Appl. No.: 09/881,946

(22) Filed: Jun. 15, 2001

(65) Prior Publication Data

US 2002/0024600 A1 Feb. 28, 2002

(30) Foreign Application Priority Data

Jun. 15, 2000 (CN) .......................... 00109267 A

(51) Int. Cl.[7] .............................................. H04N 17/02
(52) U.S. Cl. .................. 348/182; 348/180; 348/184; 348/189; 348/655; 348/658
(58) Field of Search ................... 348/180, 182, 348/603, 655, 184, 185, 189, 191, 656, 379, 380, 658

(56) References Cited

U.S. PATENT DOCUMENTS

| | | | | |
|---|---|---|---|---|
| 4,415,921 A | * | 11/1983 | Mulvanny et al. | 348/191 |
| 4,511,920 A | * | 4/1985 | Iijima et al. | 348/194 |
| 4,709,262 A | | 11/1987 | Spieth et al. | |
| 4,742,387 A | * | 5/1988 | Oshima | 348/658 |
| 5,081,523 A | * | 1/1992 | Frazier | 348/178 |
| 5,742,338 A | * | 4/1998 | Nose | |
| 5,943,092 A | * | 8/1999 | Chuang et al. | 348/177 |
| 6,097,445 A | * | 8/2000 | Goto et al. | 348/655 |
| 6,172,719 B1 | * | 1/2001 | Kim | 348/655 |
| 6,292,228 B1 | * | 9/2001 | Cho | 348/603 |

FOREIGN PATENT DOCUMENTS

| | | |
|---|---|---|
| EP | 0322791 | 3/1995 |
| GB | 2149261 | 6/1985 |
| JP | 62-268289 | 11/1987 |

* cited by examiner

*Primary Examiner*—Michael H. Lee
*Assistant Examiner*—Paulos M. Natnael
(74) *Attorney, Agent, or Firm*—Fulbright & Jaworkski LLP

(57) ABSTRACT

This invention relates to an apparatus and method for real-time testing of television picture colors. It can conduct real-time testing and adjusting of colors at various pixels to make tree and grass greener. The apparatus in accordance with the present invention includes a chromatic-coordinate testing circuit and a chromatic-coordinate bias circuit for each set color and configuring them between the television signal output and the video-driving amplifier. The pixel identified by the chromatic-coordinate testing circuit is the pixel to be adjusted. The chromatic-coordinate bias circuit controls and changes the bias current or bias voltage output to the video-driving amplifier in color television sets so that the connected three-color electron gun produces color bias effects on the monitor screen.

3 Claims, 3 Drawing Sheets

APPARATUS AND METHOD FOR REAL-TIME TESTING/ADJUSTING OF TELEVISION PICTURE COLORS

BACKGROUND OF THE INVENTION

1. Field of Invention

The present invention relates to television technology, in particular, to a method and apparatus for real-time testing and adjusting of television picture colors.

2. Description of Related Art

During shooting, editing, transmitting, and receiving of television programs, the pixels of video signals may be attenuated and thus become distorted due to various factors, resulting in disharmony and fade of actually received pictures, presenting the audience a stale, unreal, or even depressive feeling.

Currently, the real-time adjusting of television picture colors is for the whole picture, that is, unidirectional adjustment instead of separate real-time testing and adjusting of colors at each pixel. For instance, it is impossible to adjust the picture of lawn to be brighter green or human skin to appear lifelike and ruddy.

SUMMARY OF THE INVENTION

The present invention is to provide a method and apparatus for real-time testing and adjusting of television picture colors that can perform real-time testing and adjusting of colors at each pixel, thus presenting views vivid and appealing television pictures.

The objective of the present invention is implemented by a real-time testing and adjusting method for TV-picture color, which includes the steps of providing a chromatic-coordinate testing circuit and a chromatic-coordinate bias circuit that is connected to the output of the chromatic-coordinate testing circuit so as to adjust each color; receiving TV signals by the chromatic-coordinate testing circuit, identifying by the chromatic-coordinate testing circuit a pixel of identity feature as the one to be chromatically biased; and controlling by the chromatic-coordinate bias circuit the bias applied to the video-driving amplifier of the TV set.

The controlling step further includes the increasing or decreasing of either output of bias current or output of bias voltage by a resistor.

The pixel of identity feature is the one to be biased, which refers to that the television signal has the parameters characteristics of the pixel or is a signal with certain characteristics after being processed.

The identifying step is to compare received video signals, comprises of the step of presetting the signal that corresponds to the pixel to be chromatically biased to be proportional to a particular value or signal components after comparison. The pixel is determined as the one to be chromatically biased after the compared result is consistent with the preset value.

The comparison can be performed separately or simultaneously for signal components.

The chromatic-coordinate testing circuit attenuates the three primary colors (RGB) signals respectively so as to make the R, Q and B values of the pixel to be chromatically biased identical.

The television signals include three primary color (red, green, and blue) signals, color difference signals, component signals, modulation signals, and digital signals.

When the television signals are color-difference signals, component signals, or modulation signals, a decoder converts them into three primary color (R, G5 and B) signals and then forwards them to chromatic-coordinate testing circuit.

When the television signals are color-difference signals, component signals, or modulation signals, the chromatic-coordinate testing circuit and the chromatic-coordinate bias circuit test and adjust these signals, and after the decoder converts them into three primary color (R, Q and B) signals, output the bias signal to the video-driving amplifier.

When the television signals are digital signals, the comparator of the chromatic-coordinate testing circuit compares the signals with digital codes of the pixel to be chromatically biased that are read from a memory. A controller of the chromatic-coordinate testing circuit receives the output of the comparator and forwards biasing signals to the video-driving amplifier.

When the television signals are the three primary color (R, Q and B) signals, color-difference signals, component signals, or analog signals for modulation signals, an A/D converter converts the analog signals into digital values, then the digital values are compared with corresponding signal values of the pixel to be chromatic-biased that are read from the memory. The controller of the chromatic-coordinate bias circuit receives and amplifies the output of the comparator, and forwards biased signal to the video-driving amplifier.

In the controlling step, the changing of the output applied to the video-driving amplifier is performed by setting up the gain of the amplifier in the chromatic-coordinate bias circuit according to the amount to be adjusted.

A real-time testing and adjusting apparatus in accordance with the present invention comprises a chromatic-coordinate testing circuit for adjustment of colors and chromatic-coordinate bias circuits coupled to each output of the chromatic-coordinate testing circuit; the input of the chromatic-coordinate testing circuit is the television signals while the output of each chromatic-coordinate bias circuit is coupled to the video-driving amplifier.

The chromatic-coordinate testing circuit comprises an attenuation circuit, an AND logic gate, and an OR logic gate. The input of the attenuation circuit receives color television signals including RGB signals, the inputs of the AND logic gate and the OR logic gate are coupled in parallel with the output of the attenuation circuit respectively. The chromatic-coordinate bias circuit comprises a biasing circuit, a comparator, and an amplifier. The first input of the comparator is coupled to the output of the AND logic gate and the second input is coupled to the output of the biasing circuit. The input of biasing circuit is coupled to the output of the OR logic gate. The output of the comparator is coupled to the amplifier, and the output of the comparator is coupled to the video-driving amplifier.

The real-time testing and adjusting apparatus in accordance with the present invention further comprises a decoder arranged before the attenuation circuit of the chromatic-coordinate testing circuit to convert the color-difference signals, component signals, or modulation signals into RGB signals; the decoder may also be arranged between the comparator and amplifier to convert the tested and adjusted color-difference signals, component signals, or modulation signals into RGB signals.

In case of digital signals, the chromatic-coordinate testing circuit and chromatic-coordinate bias circuit comprise a microprocessor-based controller, a comparator, and a memory. Digital signals are applied to the first input of the comparator and the output of the memory is coupled to the second input of the comparator. The output of the comparator is coupled to the controller, and the output of the controller is coupled to the comparator and memory respectively. The output of the controller is coupled to the video-driving amplifier.

When the television signals are three primary color (RGB) signals, component signals, or analog signals of the modulation signals, the chromatic-coordinate testing circuit and chromatic-coordinate bias circuit comprise a microprocessor-based controller, an A/D converter, a comparator, a memory, and an amplifier. Analog signals are converted by the A/D converter into digital signals and forwarded to the first input of the comparator. The second input of the comparator is coupled to the output of the memory. The output of the comparator is coupled to the controller. The control terminal of the controller is coupled to the comparator and memory respectively. The output of the controller is coupled to the amplifier, and the output of the amplifier is coupled to the video-driving amplifier.

The invention method and apparatus for real-time testing and adjusting television picture colors are implemented through setting the chromatic-coordinate testing circuit and the chromatic-coordinate bias circuit, providing a solution to the distortion of color signals for television picture by adjusting the level of color signals.

The pixel having identifiable characteristics in accordance with the present invention refers to either the characteristics of various signals corresponding to the pixel to be biased or the characteristics appearing after being processed, such as the equal values for attenuated red, green and blue. The television signals having the parameter characteristics of the pixel in accordance with the present invention refer to that the values of three primary color signals (RGB), color-difference signals, component signals, modulation signals, and digital signals corresponding to chromatic-coordinate pixel, and these signal values which after being processed (such as attenuation) all have its respective correlation with the chromatic-coordinate pixel.

As shown by experiments, the adjusted television pictures appear fresher and brighter than what they were before the adjustment, tree leaves and lawns (appear as )greener and human skin (appear as) ruddier, thereby providing a more vivid and vigorous screen effect. With a method of similar mechanism and an apparatus of similar structure, the present invention can also perform testing and adjusting for color-difference signals, component signals and modulation signals. Through variation of the embodiment of the chromatic-coordinate testing circuit and the chromatic-coordinate bias circuit, the technology in the present invention can also be applied to either digital televisions or analog televisions.

BRIEF DESCRIPTION OF THE DRAWINGS

The present invention will be further described in conjunction with embodiments and accompanying drawings.

DETAILED DESCRIPTION

The real-time testing and adjusting circuit for television picture colors is implemented on the basis of regular components of color television sets and the inventive method solves the deterioration problem of television picture colors during reception and makes adjustment on certain color pixels of a TV picture whenever necessary.

Figure 1:
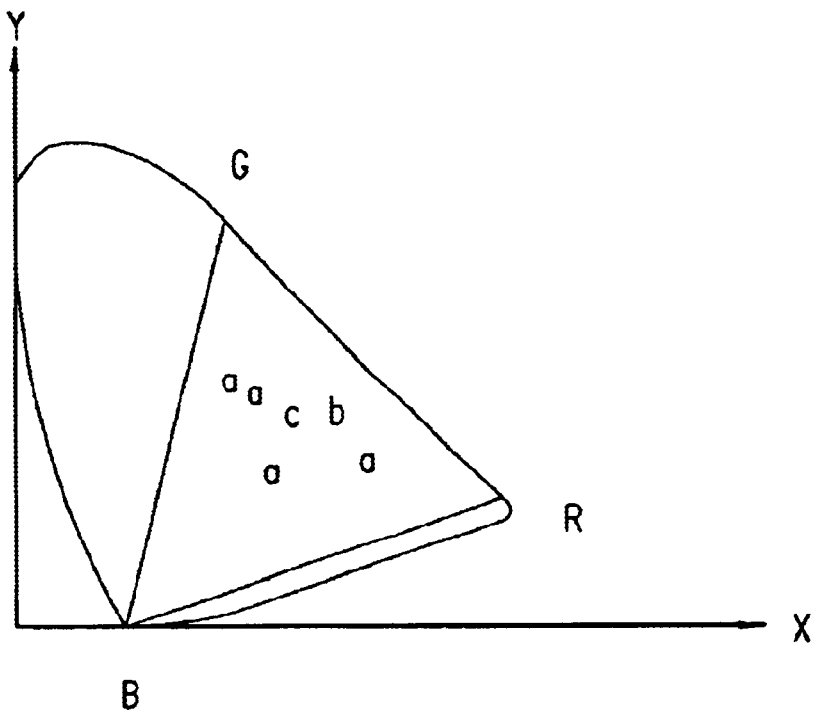
FIG. 1 is a x-y chromaticity diagram.

FIG. 1 shows an x-y chromaticity (chromatic coordinate) diagram of TV for schematically illustrating the mechanism of the real-time testing and adjusting in accordance with the present inventive method. Three points R, G, and B stand for three colors (RGB) respectively, (hereinafter referred to as primary colors). For arbitrary pixels a, b, and c in FIG. 1, in their color components all the three primary colors take a certain respective ratio. To adjust the color for the pixel a and to make it greener and fresher, it is for pixel a to close to point G. The adjustment is performed as follows. The chromatic-coordinate testing circuit determines first if the tested pixel is the one to be color-biased, essentially by attenuating the tested signals. Where the pixel is to be adjusted, an additional bias current is applied to the video-driving amplifier (chromatic-coordinate bias execution circuit) in the color television under the control of the bias circuit, to increase the output of the video-driving amplifier. As such, the output of the green (G) electron gun is enhanced by the video-driving amplifier so that the color of the pixel a is adjusted as desired in the picture presented with the output from CRT, thereby providing greener and fresher picture. Similarly, the method can be used to adjust the color of the pixel b towards red (R) color to make it fresher and ruddier, or to adjust the color of the pixel c towards blue (B) color to make it fresher and bluer.

When the chromatic-coordinate testing circuit performs testing and comparing of the three primary colors component ratio of a pixel (e.g. pixel a) in a television picture, other colors in the television picture are also tested and attenuated at the same time. However, since the attenuation coefficient is preset in the attenuation circuit, the R, G, and B values at pixel a alone is attenuated to the preset values, which are different from attenuated R, G and B values at other pixels, so the chromatic-coordinate (G) bias circuit does not output additional bias current to the video-driving amplifier for other colors, other colors will not be adjusted; here the chromatic-coordinate (G) bias circuit outputs green (red, blue) signals. Since the electron gun of CRT makes time-shared scan, undistinguished with human eyes, signals are pixel-to-pixel scanned on the screen and the tested pixel corresponding to the signals of the pixel a only is biased as adjusting the pixel a without disturbing colors at other pixels.

The comparison method in accordance with the present invention comprises the comparison of values of the three primary colors (RGB), and comprises the comparison of color-difference signals, component signals, modulation signals and digital signals as well. Such comparisons can be made directly or after processing such as attenuation. The comparison may be performed for respective signal components separately, or may be performed for signal components simultaneously. The comparison for red, green, and blue values can be made in different circuits separately or in a single circuit simultaneously.

Figure 2:
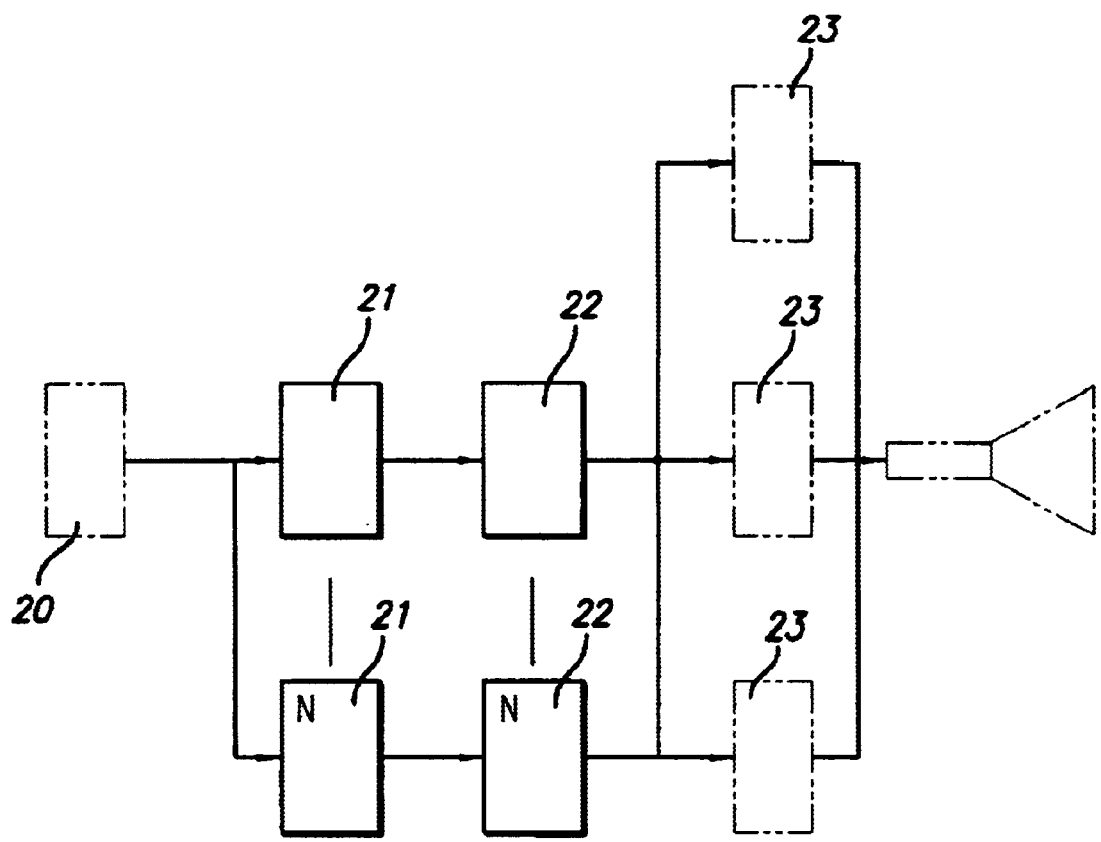
FIG. 2 is a block diagram of the real-time testing/adjusting circuit for TV picture colors in accordance with the present invention.

FIG. 2 is a block diagram showing schematic constitution of a real-time testing/adjusting circuit for TV picture colors in accordance with the present invention, which comprises 1 or N chromatic-coordinate testing circuits as circuit 21 and 1 or N chromatic-coordinate bias circuits as circuit 22 coupled in parallel between the video decoder 20 and three video-driving amplifiers (i. e. chromatic-coordinate bias execution circuits for R, C, and B) 23. Wherein N is set depending on the variety of colors to be tested and biased, for example, it is 3 as the colors G, W, and R. These three video-driving amplifiers 23 are respectively coupled to three electron guns for red, green and blue (R, G, B) of CRT.

According to the color types and amounts to be biased, the chromatic-coordinate bias circuit 22 outputs corresponding bias current or bias voltage by altering the resistance to output corresponding bias voltage to the video-driving amplifier 23 in accordance with R, G and B values. The video-driving amplifier 23 drives the R, G, and B electron guns of CRT respectively, controls their output currents and thus performs the real-time testing and adjusting of colors. One combination of chromatic-coordinate testing circuit 21 and chromatic-coordinate bias circuit 22 only can be used for real-time testing and adjusting of one color.

Figure 3:
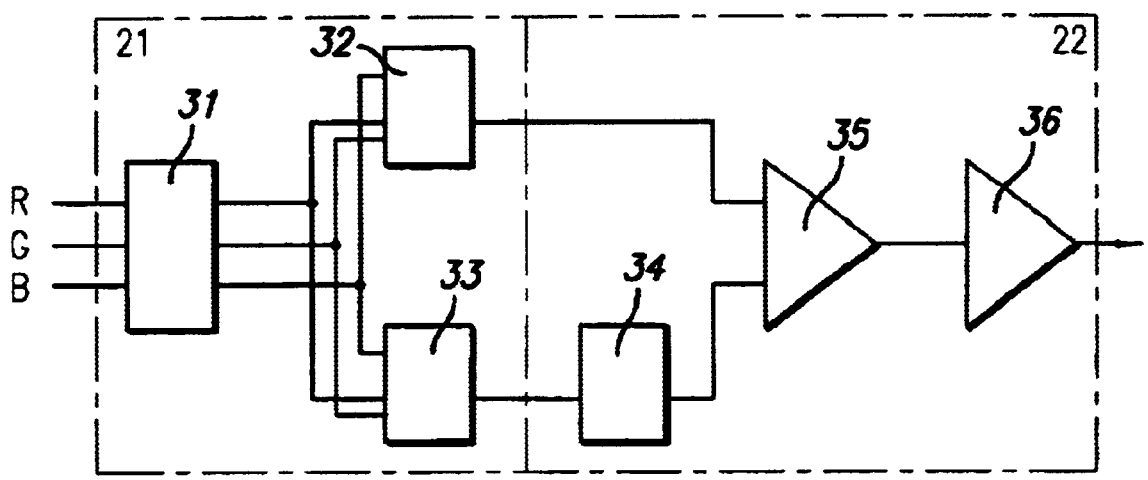
FIG. 3 is an electronic schematic diagram of the real-time testing/adjusting circuit for TV picture colors in accordance with the present invention.

FIG. 3 shows an electronic schematic constituting a real-time testing/adjusting circuit for TV picture colors in accordance with the present invention, wherein the chromatic-coordinate testing circuit 21 comprises of an attenuation circuit 31, an AND logic gate 32, and an OR logic gate 33. The chromatic-coordinate bias circuit 22 comprises of a bias circuit 34, a comparator 35, and an amplifier 36. The attenuation circuit 31 may consists of three potentiometers coupled in parallel, with the attenuation coefficient of each potentiometer being preset. Each potentiometer attenuates one of R, G, and B signals so that the output R, Q and B values of the signal to be biased are equal to each other.

When the television signals are red, green, and blue signals, the attenuation circuit 31 attenuates the R, Q and B signals from video decoder 20 according to certain attenuation coefficients. For instance, with a circuit to adjust the green signal, the attenuation coefficient is to be present for the attenuation circuit 31 so that only R, G, and B values of the signal corresponding to green color are equal to each other in the attenuation result. The signal attenuated by the attenuation circuit 31 is forward through AND logic gate 32 and OR logic gate 33 respectively, and inputted to the chromatic-coordinate bias circuit 22. The output of the AND logic gate 32 is coupled to one input of the comparator 35 while the output of the OR logic gate 33 is coupled to the other input of the comparator 35 via the bias circuit 34. The output of the comparator 35 is coupled to the amplifier 36 of which the output is coupled to the video-driving amplifier 23. Finally, the chromatic-coordinate bias circuit 22 applies a bias current or a bias voltage by altering the ser divider resistor to the video-driving amplifier 23 according to the color and amount to be biased and the red, green, and blue component ratio in that color. The video-driving amplifier 23 then controls the output current applied to RGB electron guns.

The attenuation circuit 31, AND logic gate 32, OR logic gate 33, bias circuit 34, comparator 35, and amplifier 36 in FIG. 3 can all be implemented with conventional technologies.

In order to adjust pixel a in FIG. 1 towards green, the ratio of R, G, and B values for the pixel a is 1:5:4. The R, G, and B signals of television picture signals from the video decoder 20 are applied to attenuation circuit 31. The attenuation coefficients of the preset R, G, and B signals for the three potentiometers of the attenuation circuit 31 are 3:0.2:0.25. The attenuation circuit 31 attenuates R, Q a signals for all colors but only makes the ratio of R, Q and B for color signal at pixel a be 1:1:1. The signals with the same ratio of R, Q and B in the output signals from the present attenuation circuit 31 are signals to be adjusted. When the ratios of R, Q and for output signals from AND logic gate 32 and OR logic gate 33 are equal to each other, the tested chromatic coordinates pixel a is identified. When the value is different from the R, Q and B ratio for the output signals from the attenuation circuit 31, that is different from the R, Q and B ratio for the input signals to AND logic gate 32 and OR logic gate 33, the output signals from AND logic gate 32 and OR logic gate 33 do not present the tested chromatic coordinates pixel a.

The case of unequal ratio can be further explained as follows: when any value of the three output signal from the attenuation circuit 31 is less than those of other two, the output of AND logic gate 32 inverts to a low level while the output from OR logic gate 33 remains unchanged; when any value of the three output signals from OR logic gate 31 is higher than those of other two, the output of AND logic gate 32 inverts to a low level while the output from OR logic gate 33 keep unchanged. In both cases, the amplifier 36 does not generate output current and so does not change the colors of television picture.

The bias circuit 34 offsets the output signals from OR logic gate 33 before sending them to the comparator 35. When the ratios of R, Q and B in the three output signal from the attenuation circuit 31 are unequal to each other, the output signals from the bias circuit 34 does not enable the comparator 35 to drive the amplifier 36 to operate in the range of linearity; when the ratios of R, Q and B in the three output signal from the attenuation circuit 31 are equal to each other, the output signals from the bias circuit 34 enables comparator 35 to drive the amplifier 36 to operate within the range of linearity, so the amplifier 36 applies additional bias current to an existing video-driving amplifier 23 of TV set, making the output of the existing video-driving amplifier 23 increase accordingly. Then RGB electron guns coupled to the amplifier 23 cause the color at pixel a to defect towards green on the screen of CRT. The biasing amount can be controlled by adjusting the gain of amplifier 36. When the device adjustment is completed, the gain of the amplifier is set. (It should be noted that when conducting the chromatic-coordinate testing, the circuit with the R, G and B values attenuated to equal to each other is the most economical, therein requiring only one comparator; otherwise, three comparators are needed for comparing of R, G, and B values separately.)

In addition, if the R, G, and B signals of colors to be biased are mixed, three amplifiers 36 are needed, each with different adjusting gain (or one amplifier set only, having its output divided into three branches, with each coupled in series to a resistance of different value respectively) for controlling ratios of R, G and B in output color after adjusting. For example, to bias towards the color of skin which has different ratio for the three primary colors R, Q and B, three amplifiers 36 have to be used and coupled to three video-driving amplifiers of the 3-color electron gun in the CRT respectively, and output bias current or bias voltage applied to the three video-driving amplifiers according to the ratio of R, G, and B in color of skin.

To adjust towards blue in which the values R and G are zero, only the amplifier 36 corresponding to blue electron gun outputs bias current to video-driving amplifier without both red and green output, thus saving the two amplifiers. Similarly, when adjusting to color white in which R, G, and B values are equal to each other, one amplifier may be just used to output bias current or bias voltage to the three video-driving amplifier circuits simultaneously.

The method and apparatus in accordance with the present invention can be designed for various television signals adaptively. For example, when the television signals are red, green, and blue signals, the chromatic-coordinate testing circuit is directly coupled to the existing video decoder, as shown in FIG. 3, so that the signals corresponding to the color to be adjusted have preset values or certain ratio. And the chromatic-coordinate bias circuit compares the testing result with three sets of comparators, controls the amount of additional bias current output to the existing video amplifier of TV set, implementing color bias. (Increasing output bias current and decreasing original output current are identical in principle, but the bias direction and effect being inversed. Decreasing bias current can be implemented with adding shunt circuit in video-driving amplifier circuit.)

Figure 4:
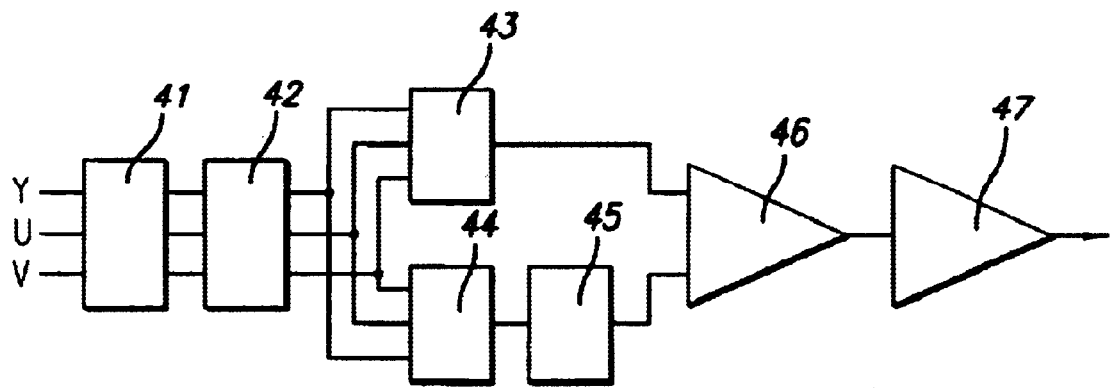
FIG. 4 is an electronic schematic diagram of the real-time testing/adjusting circuit when TV signals are component signals.

If television signals are color-difference signals or component signals or modulation signals (e.g. combined video signal, super VES signal), as shown in FIG. 4, the decoder 41 should be arranged before the attenuation circuit 42 of the testing circuit, to convert the color-difference signal or component signals or modulation signals Y, U, and B in to R, Q and B signals, then make testing and bias adjusting. Similar to FIG.3, the circuit shown in FIG.4 comprises a testing circuit consisting of interconnected attenuation circuit 42, AND logic gate 43 and OR logic gate 44 and a biasing circuit having interconnected bias circuit 45, comparator 46, and amplifier 47.

The decoder 41 can also be arranged between the comparator 46 and amplifier 47 of biasing circuit, to convert tested and adjusted color-difference signals, component signals, or modulation signals into R, Q and B signals. Then, the biasing signals are output to the existing video-driving amplifier of TV set, thus completing the test and adjustment for those signals.

Figure 5:
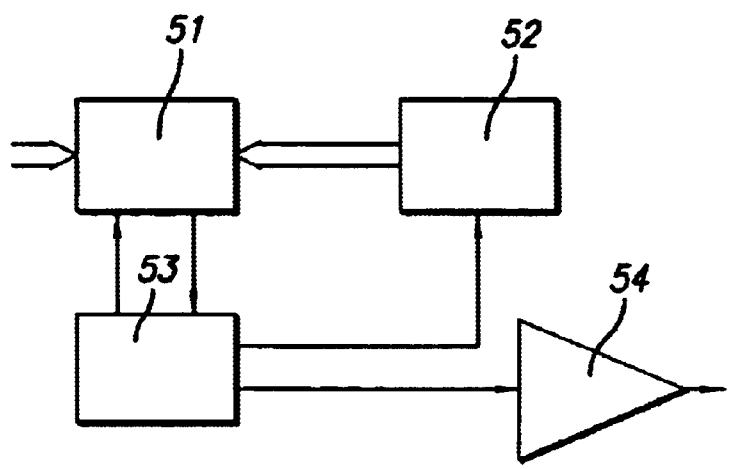
FIG. 5 is an electronic schematic diagram of the real-time testing/adjusting circuit when TV signals are analog signals.

When television signals are digital signals, as shown in FIG. 5, the testing circuit and the biasing circuit can also be implemented by interconnected comparator 51, microprocessor-based controller 53, and memory 52. The comparator 51 tests digital signals, reads encoded signals of the color to be biased from the memory 52, and compares them with the digital signals under control of the program of the controller 53, sending comparison results to controller 53. The controller 53 outputs bias current to existing video-driving amplifier of TV set for the color to be biased, thus completing the testing and adjusting of colors.

Figure 6:
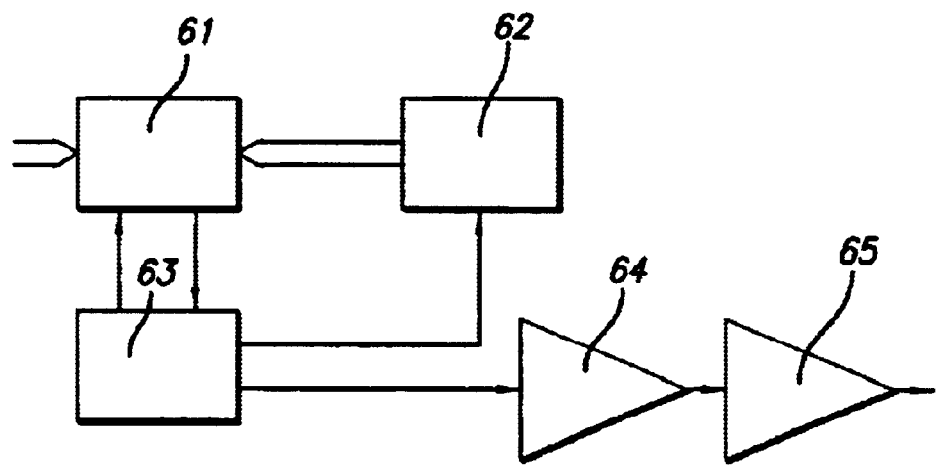
FIG. 6 is an electronic schematic diagram of the real-time testing/adjusting circuit when TV signals are analog signals.

As shown in FIG.6, when television signals are R, G and B signals, color-difference signals, component signals, or analog signals of modulation signal, the testing circuit and the biasing circuit can also implemented by interconnected comparator 61, microprocessor-based controller 63, memory 62, and amplifier 64, an A/D converter(not shown) should be arranged before the comparator 61, to convert the analog signals into digital signals. The comparator 61 tests the digital signals, reads signal values corresponding to the pixel to be color-biased from the memory 62, and compares them with digital signals under the control of the program of the controller 63, sending the comparison results to the controller 63 and amplified by the amplifier 64. Then a bias signal is output to the existing video-driving amplifier 65 of the television sets, thus completing the testing and adjusting of colors.

The chromatic-coordinate testing circuit and chromatic-coordinate bias circuit in accordance with the present invention can be integrated within the existing controller of TV set, or can be arranged outside as a separate unit.

What is claimed is:

1. A real-time testing and adjusting apparatus for television picture colors comprising:
    a chromatic-coordinate testing circuit corresponding to color requiring adjusting; and
    a chromatic-coordinate bias circuit connected to the output of each chromatic-coordinate testing circuit;
    wherein, the input of the chromatic-coordinate testing circuit is the television signals while the output of each chromatic-coordinate bias circuit is connected with the video-driving amplifier of the color television set and wherein the chromatic-coordinate testing circuit includes
        an attenuation circuit having an input receiving color television signals including red, green, and blue signals and an output;
        an AND logic gate connected in parallel with the output of the attenuation circuit; and
        an OR logic gate connected in parallel with the output of the attenuation circuit; and
        the chromatic-coordinate bias circuit includes a bias circuit having an input connected to the output of the OR logic gate;
        a comparator having a first input connected to the output of the AND logic gate and a second input to the output of the bias circuit; and
        an amplifier connected to an output of the comparator and having an output connected to the video-driving amplifier.

2. A real-time testing and adjusting apparatus for television picture colors comprising:
    a chromatic-coordinate testing circuit corresponding to colors requiring adjusting; and
    a chromatic-coordinate bias circuit connected to the output of each chromatic-coordinate testing circuit;
    wherein, the input of the chromatic-coordinate testing circuit is the television signals while the output of each chromatic-coordinate bias circuit is connected with the video-driving amplifier of the color television set and wherein for digital signals, the chromatic-coordinate testing circuit and chromatic-coordinate bias circuit include a microprocessor-primary controller, a comparator, and a memory, said digital signals being input to first input of the comparator while the output of the memory is connected to the second input, the output of the comparator being connected to the controller, the control output of which is connected to the comparator and memory, respectively, the output of the controller being connected to the video-driving amplifier.

3. A real-time testing and adjusting apparatus for television picture colors comprising:
    a chromatic-coordinate testing circuit corresponding to colors requiring adjusting; and
    a chromatic-coordinate bias circuit connected to the output of each chromatic-coordinate testing circuit;
    wherein, the input of the chromatic-coordinate testing circuit is the television signals while the output of each chromatic-coordinate bias circuit is connected with the video-driving amplifier of the color television set and wherein when the television signals are three primary color (red, green, and blue) signals, component signals, or analog signals for the modulation signals, the chromatic-coordinate testing circuit and chromatic-coordinate bias circuit include a microprocessor-composed controller, an analog-digital converter, a comparator, a memory, and an amplifier, analog signals being converted by the analog-digital converter into digital signals and then input to the first input of the comparator, the second input end of which is connected to the output of the memory, the output of the comparator being connected to the controller, the control output of which is connected to the comparator and memory, respectively, the output of the controller being connected to the amplifier, the output of which is connected to the video-driving amplifier.

* * * * *